United States Patent
Wick et al.

(10) Patent No.: US 12,182,728 B1
(45) Date of Patent: *Dec. 31, 2024

(54) PRICE-DEMAND ELASTICITY AS FEATURE IN MACHINE LEARNING MODEL FOR DEMAND FORECASTING

(71) Applicant: Blue Yonder Group, Inc., Scottsdale, AZ (US)

(72) Inventors: Felix Christopher Wick, Thaleischweiler-Fröschen (DE); Shyam Narasimhan, Irving, TX (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 553 days.

This patent is subject to a terminal disclaimer.

(21) Appl. No.: 17/166,563

(22) Filed: Feb. 3, 2021

Related U.S. Application Data (60) Provisional application No. 62/983,877, filed on Mar. 2, 2020.

(51) Int. Cl.
| | |
|---|---|
| G06Q 30/02 | (2023.01) |
| G06N 5/04 | (2023.01) |
| G06N 20/20 | (2019.01) |
| G06Q 30/0202 | (2023.01) |

(52) U.S. Cl.
CPC ............... *G06N 5/04* (2013.01); *G06N 20/20* (2019.01); *G06Q 30/0202* (2013.01)

(58) Field of Classification Search
CPC ....... G06N 5/04; G06N 20/20; G06Q 30/0202
See application file for complete search history.

(56) References Cited

U.S. PATENT DOCUMENTS

| | | | |
|---|---|---|---|
| 2019/0156357 A1* | 5/2019 | Palinginis | G06Q 30/0201 |
| 2019/0188536 A1* | 6/2019 | Lei | G06F 17/10 |
| 2020/0401643 A1* | 12/2020 | Liu | G06N 3/084 |

OTHER PUBLICATIONS

University of Chicago, Sir Ronald A. Fisher "Design of Experiments" (Year: 1935) (Year: 1935).*
Approaches to Machine Learning, P. Langley at Carnegie-Mellon University (Year: 1984).*
Felix Wick, Michael Feindt, Charm Baryon Spectroscopy (Year: 2011).*
Machine Learning and Knowledge Discovery in Databases (Year: 2012).*

(Continued)

*Primary Examiner* — Breffni Baggot
(74) *Attorney, Agent, or Firm* — Spencer Fane LLP; Steven J. Laureanti (57) ABSTRACT

A system and method are disclosed to identify one or more price-demand elasticity causal factors and to forecast demand using the one or more price-demand elasticity causal factors. Embodiments include a computer comprising a processor and memory. Embodiments train a machine learning model to identify one or more external causal factors that influence demand for one or more products. Embodiments train the machine learning model to generate one or more price-demand elasticity causal factors to predict a target outcome for a given product demand. Embodiments predict, with the machine learning model, a demand for the one or more products based, at least in part, on the identified one or more external causal factors and the generated one or more price-demand elasticity causal factors.

14 Claims, 4 Drawing Sheets

(56) References Cited

OTHER PUBLICATIONS

KIT Advanced event Reweighting for Multivariate Analysis (MVA) training (Year: 2011).*
Wiley Encyclopedia of Computer Science and Engineering (Year: 2009).*
Cyclic Boosting—an explainable supervised ML algorithm, by Felix Wick, Michael Feindt (Year: 2019).*

* cited by examiner

PRICE-DEMAND ELASTICITY AS FEATURE IN MACHINE LEARNING MODEL FOR DEMAND FORECASTING

CROSS-REFERENCE TO RELATED APPLICATIONS

The present disclosure is related to that disclosed in the U.S. Provisional Application No. 62/983,877, filed Mar. 2, 2020, entitled "Price-Demand Elasticity as Feature in Machine Learning Model for Demand Forecasting." U.S. Provisional Application No. 62/983,877 is assigned to the assignee of the present application. The subject matter disclosed in U.S. Provisional Application No. 62/983,877 is hereby incorporated by reference into the present disclosure as if fully set forth herein. The present invention hereby claims priority under 35 U.S.C. § 119 (e) to U.S. Provisional Application No. 62/983,877.

TECHNICAL FIELD

The present disclosure relates generally to data processing, and more in particular relates to data processing for retail and demand forecasting using supervised machine learning with price-demand elasticity features as well as causal inference of price changes to demand by means of machine learning.

BACKGROUND

Machine learning techniques may generate one or more machine learning models that forecast demand for products or items sold at retail or from individual customers over a defined time period, or that provide other forecasts based on historical data. To forecast demand, machine learning models may model the influence of exterior causal factors, such as, for example, product prices, known holidays, sales promotions, or incoming weather events that may make customer travel to and from a retail location difficult, as a source of information with direct causal structure, compared to the mere temporally confounded information from lagged target time series data. However, machine learning models that do not learn price-demand elasticity features may fail to detect and incorporate a significant outcome-predicting model feature. Furthermore, one or more confounding variables that affect both causal factors and the machine learning target may mask or dilute the causal effect of one or more causal factors, making it difficult for machine learning techniques to correctly identify and characterize the causal effect and leading to undesirable or inaccurate cause-effect relationships.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a model training system and method that generates one or more machine learning models that utilize one or more price-demand elasticity features to predict target outcomes for demand forecasting. In an embodiment, the model training system may also deconfound input data, determine the causal effect structure of the input data, and generate one or more machine learning models that perform one or more demand shaping actions after having determined the effect that price-demand elasticity has on product demand and sales. In this deconfounding embodiment, the model training system may apply one or more deconfounding actions to the input data, such as, for example, by conducting a randomized controlled A/B group trial, to separate the effect of one or more causal variables, including but not limited to price-demand elasticity, from confounding variables. The one or more machine learning models may identify one or more causal factors X to predict an outcome volume Y (target). Having identified one or more causal factors and the outcomes influenced by the one or more causal factors, the model training system may generate and display graphs, charts, or other displays predicting the outcome of altering one or more causal factors.

Embodiments of the following disclosure enable machine learning models to utilize price-demand elasticity causal factors and observational data to perform accurate demand forecasting and, in embodiments that further determine causal effects by deconfounding the input data, to perform demand shaping and to quantify the individual causal effects of defined causal variables on considered outcomes while reducing confounding variables that may dilute the effects of one or more causal variables. In turn, embodiments of the following disclosure enable inferences or predictions in causal what-if scenarios in which one or more causal variables are changed (such as, for example, mailing targeting coupons to selected customers in a customer database to influence product sales, or reducing prices for one or more products to stimulate increased sales). These demand shaping examples are distinguished from demand forecasting scenarios based on changes of causal factors in the sense of features in a machine learning model, which merely represent the changes in the predictions due to the learned multivariate statistical dependencies and not necessarily reflect the true cause-effect relationship.

In demand shaping embodiments, it is crucial for the machine learning models to distinguish between the specific causal effect from a causal variable (such as price) to be predicted in causal inference and the various causal factors represented as features in a machine learning model. In the case of the former, a full deconfounding is required to properly describe the cause-effect relationship (such as the effect of a chosen price on demand for a product). For the latter, machine learning models may make use of statistical dependencies in the data and may distribute causal effects on the target arbitrarily over several correlated features. For the purposes of this disclosure, the term causal factor is meant in a qualitative way and there may be significant deviations to the actual causal effect of a causal factor as a feature of the target variable due to confounding by other variables. According to embodiments, the model training system may perform partial deconfounding by means of the techniques described below.

The prediction of an individual causal effect on a considered demand quantity, such as product sales over a given period of time, in relation to a causal variable, such as a product prices, is a counterfactual task, because only one of the possibilities (such as, for example, full price or discounted price) can be true. Therefore, prediction of an individual causal effect requires generalized learning from a larger population of customers, a situation that may be suitable for machine learning approaches.

Figure 1:
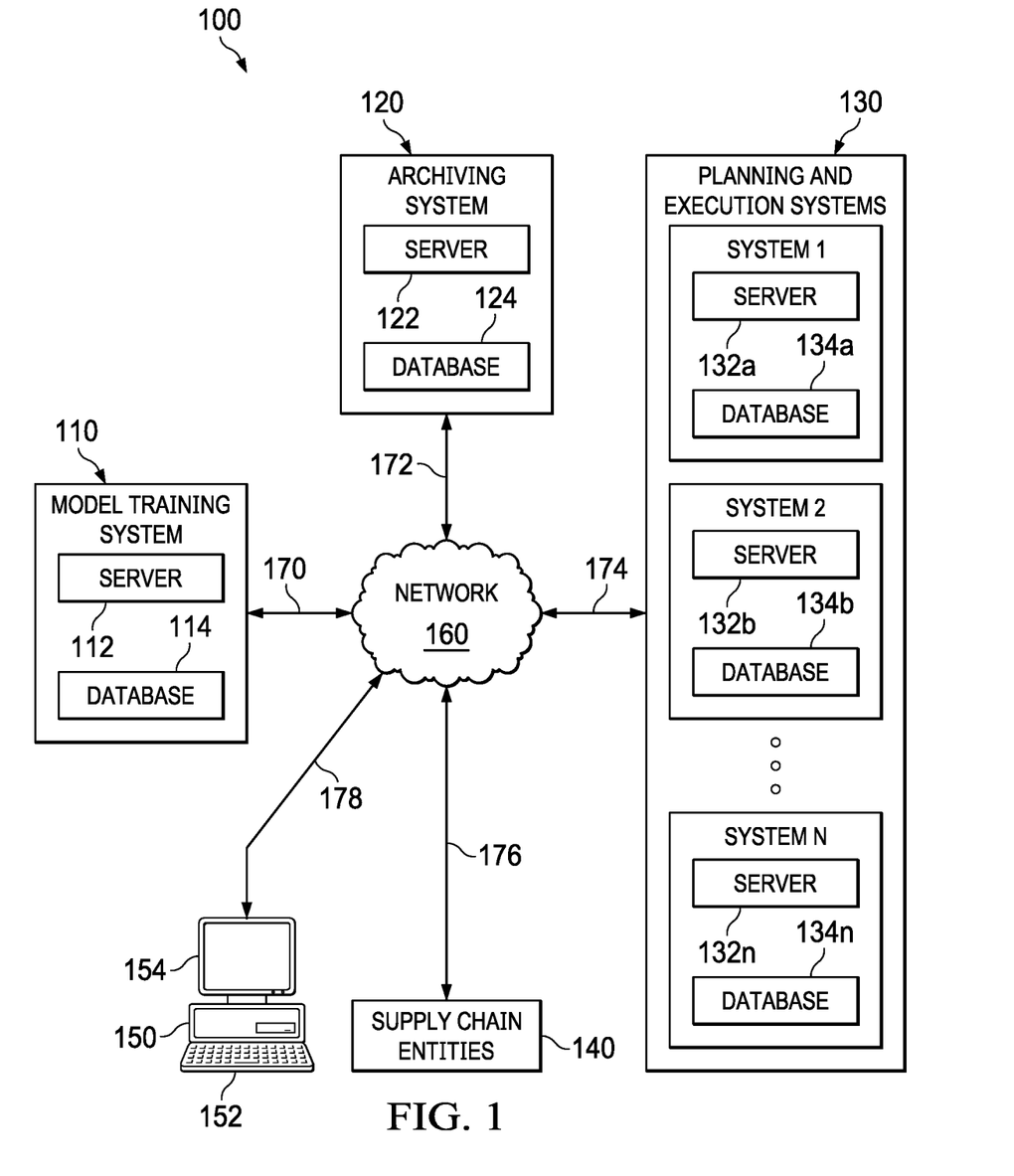
FIG. 1 illustrates an exemplary supply chain network, in accordance with a first embodiment.

FIG. 1 illustrates exemplary supply chain network 100, in accordance with a first embodiment. Supply chain network 100 comprises model training system 110, archiving system 120, one or more planning and execution systems 130, one or more supply chain entities 140, computer 150, network 160, and communication links 170-178. Although single model training system 110, single archiving system 120, one or more planning and execution systems 130, one or more supply chain entities 140, single computer 150, single network 160, and communication links 170-178 are illustrated and described, embodiments contemplate any number of model training systems 110, archiving systems 120, one or more planning and execution systems 130, one or more supply chain entities 140, computers 150, networks 160, or communication links 170-178, according to particular needs.

In one embodiment, model training system 110 comprises server 112 and database 114. As described in more detail below, model training system 110 may, in an embodiment, train a machine learning model to perform demand forecasting using one or more price-demand elasticity features. In other embodiments, in order to perform demand shaping, model training system 110 may conduct one or more randomized controlled A/B group trials to deconfound historical input data, and may use a machine learning method to train one or more machine learning models to enable individualization by means of function approximation and predict the individual causal effect on the considered demand quantity from historical data or current data. Model training system 110 may receive historical data and current data from archiving system 120, one or more planning and execution systems 130, one or more supply chain entities 140, and/or computer 150 of supply chain network 100. In addition, server 112 may comprise one or more modules that provide a user interface (UI) that displays visualizations identifying and quantifying the contribution of external causal factors to an individual prediction.

Archiving system 120 of supply chain network 100 comprises server 122 and database 124. Although archiving system 120 is shown as comprising single server 122 and single database 124, embodiments contemplate any suitable number of servers 122 or databases 124 internal to or externally coupled with archiving system 120. Server 122 of archiving system 120 may support one or more processes for receiving and storing data from one or more planning and execution systems 130, one or more supply chain entities 140, and/or one or more computers 150 of supply chain network 100, as described in more detail herein. According to some embodiments, archiving system 120 comprises an archive of data received from one or more planning and execution systems 130, one or more supply chain entities 140, and/or one or more computers 150 of supply chain network 100. Archiving system 120 provides archived data to model training system 110 and/or planning and execution system 130 to, for example, train a machine learning model or generate a prediction with a trained machine learning model. Server 122 may store the received data in database 124. Database 124 of archiving system 120 may comprise one or more databases 124 or other data storage arrangements at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 of one or more planning and execution systems 130 comprises one or more modules, such as, for example, planning module 270, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120, and one or more supply chain entities 140.

As illustrated in FIG. 1, supply chain network 100 comprising model training system 110, archiving system 120, one or more planning and execution systems 130, and one or more supply chain entities 140 may operate on one or more computers 150 that are integral to or separate from the hardware and/or software that support model training system 110, archiving system 120, one or more planning and execution systems 130, and one or more supply chain entities 140. One or more computers 150 may include any suitable input device 152, such as a keypad, keyboard, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from model training system 110, archiving system 120, one or more planning and execution systems 130, and one or more supply chain entities 140. In addition, each of the one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with model training system 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is illustrated and described, embodiments contemplate any configuration of supply chain network 100, without departing from the scope described herein. According to embodiments, model training system 110 may transmit instructions to one or more supply chain entities 140 based on one or more predictions generated by one or more trained models. By way of example only and not by way of limitation, instructions may comprise: an instruction to increase available production capacity at one or more supply chain entities 140, an instruction to alter product supply levels at one or more supply chain entities 140, an instruction to adjust product mix ratios at one or more supply chain entities 140, and/or an instruction to alter the configuration of packaging of one or more products sold by one or more supply chain entities 140.

In one embodiment, model training system 110, archiving system 120, one or more planning and execution systems 130, supply chain entities 140, and computer 150 may be coupled with network 160 using one or more communication links 170-178, which may be any wireline, wireless, or other link suitable to support data communications between model training system 110, archiving system 120, planning and execution systems 130, supply chain entities 140, computer 150, and network 160 during operation of supply chain network 100. Although communication links 170-178 are shown as generally coupling model training system 110, archiving system 120, one or more planning and execution systems 130, one or more supply chain entities 140, and computer 150 to network 160, any of model training system 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling model training system 110, archiving system 120, one or more planning and execution systems 130, one or more supply chain entities 140, and computer 150. For example, data may be maintained locally to, or externally of, model training system 110, archiving system 120, one or more planning and execution systems 130, one or more supply chain entities 140, and one or more computers 150 and made available to one or more associated users of model training system 110, archiving system 120, one or more planning and execution systems 130, one or more supply chain entities 140, and one or more computers 150 using network 160 or in any other appropriate manner. For example, data may be maintained in a cloud database at one or more locations external to model training system 110, archiving system 120, one or more planning and execution systems 130, one or more supply chain entities 140, and one or more computers 150 and made available to one or more associated users of model training system 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks 160 and other components.

Although the disclosed systems and methods are described below primarily in connection with price-demand elasticity causal factor machine learning with respect to retail demand forecasting solely for the sake of clarity, the systems and methods herein are applicable to many other applications for predicting a volume from a set of causal factors along with the contributions from each factor, including, for example, future stock and housing prices, insurance churn predictions, and drug discovery.

Figure 2:
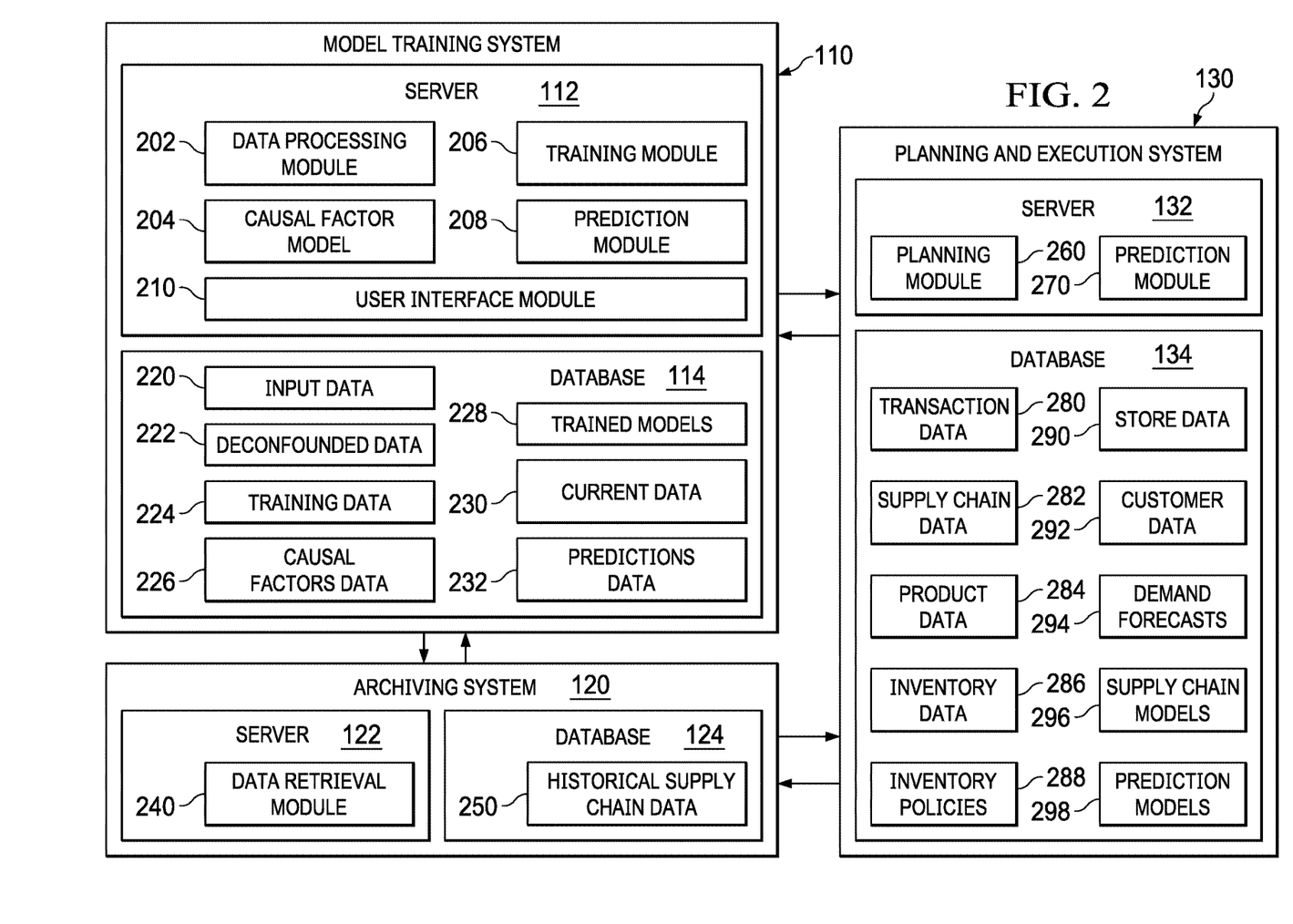
FIG. 2 illustrates the model training system, archiving system, and planning and execution system of FIG. 1 in greater detail, according to an embodiment.

FIG. 2 illustrates model training system 110, archiving system 120, and planning and execution system 130 of FIG. 1 in greater detail, according to an embodiment. Model training system 110 may comprise server 112 and database 114, as described above. Although model training system 110 is illustrated as comprising single server 112 and single database 114, embodiments contemplate any suitable number of servers 112 or databases 114 internal to or externally coupled with model training system 110.

Server 112 of model training system 110 comprises data processing module 202, causal factor model 204, training module 206, prediction module 208, and user interface module 210. Although server 112 is illustrated and described as comprising single data processing module 202, single causal factor model 204, single training module 206, single prediction module 208, and single user interface module 210, embodiments contemplate any suitable number or combination of these located at one or more locations, local to, or remote from model training system 110, such as on multiple servers 112 or computers 150 at one or more locations in supply chain network 100.

Database 114 of model training system 110 may comprise one or more databases 114 or other data storage arrangements at one or more locations, local to, or remote from, server 112. In an embodiment, database 114 of model training system 110 comprises input data 220, deconfounded data 222, training data 224, causal factors data 226, trained models 228, current data 230, and predictions data 232. Although database 114 of model training system 110 is illustrated and described as comprising input data 220, deconfounded data 222, training data 224, causal factors data 226, trained models 228, current data 230, and predictions data 232, embodiments contemplate any suitable number or combination of these, located at one or more locations, local to, or remote from, model training system 110 according to particular needs.

In one embodiment, data processing module 202 receives data from archiving system 120, supply chain planning and execution systems 130, one or more supply chain entities 140, one or more computers 150, and/or one or more data storage locations local to, or remote from, supply chain network 100 and model training system 110, and prepares the received data for use in training one or more causal factor models and in generating predictions data 232 from one or more trained models stored in trained models 228, as described in greater detail below. Data processing module 202 prepares received data for use in training and prediction by checking received data for errors and transforming the received data. Data processing module 202 may check received data for errors in the range, sign, and/or value and use statistical analysis to check the quality or the correctness of the data. According to embodiments, data processing module 202 transforms the received data to normalize, aggregate, and/or rescale the data to allow direct comparison of received data from different planning and execution systems 130, and stores the received data and/or the transformed data in model training system 110 database 114 input data 220.

In an embodiment in which model training system 110 performs one or more demand shaping actions, data processing module 202 accesses input data 220 and performs one or more deconfounding actions to process input data 220 into deconfounded data 222. Historical supply chain data 250, customer data 292, and/or input data 220 may comprise one or more confounding variables ("confounders") that influence both independent variables (such as, for example, one or more causal factors) and dependent variables (such as, for example, one or more predictions and/or machine learning model outputs). By way of example only and not by way of limitation, in an embodiment in which model training system 110 models the effect of setting a reduced product price (a causal factor independent variable) on product sales (a dependent variable influenced by, among other independent variables, the price of the products sold), the day of the week may operate as a confounder (influencing product sales volume and potentially masking or diluting the effect the reduced product price causal factor had on product sales). In an embodiment, data processing module 202 may deconfound input data 220 to reduce the influencing effect of one or more confounders on one or more independent variables, causal factors, and/or other variables or data stored in input data 220 and to enable model training system 110 to identify, isolate, and model the absolute effect of one or more causal variables, such as price and price-demand elasticity, without the diluting effect of one or more confounders.

In an embodiment in which model training system 110 performs one or more demand shaping actions, data processing module 202 may conduct one or more randomized controlled A/B group trials to deconfound input data 220 and generate deconfounded data 222. In other embodiments, data processing module 202 may use any statistical deconfounding technique, such as independence weighting with inverse propensity scores, to deconfound input data 220 and generate deconfounded data 222, according to particular needs. In an embodiment, randomized controlled trials may be the most precise way to achieve full deconfounding, as the distribution of the considered prediction granularity, for example customers or items, to the groups is done randomly and so all causal effect from potential confounding variables are removed.

Independence weighting with inverse propensity scores provides an alternative for deconfounding in embodiments in which a randomized controlled trial is not feasible, for example learning purely from historical data that was generated by some action policy. Independence weighting may comprise, for example, an additional training and prediction step to calculate and apply the historic data independence weights in form of inverse propensity scores. The propensity scores are estimated as outcome of a separate machine learning model predicting the values of the considered causal variable, for example a price reduction, according to the historical action policy by including all potential confounding variables as features. The so-calculated independence weights are then used as sample weights in the machine learning trainings for the prediction of the individual causal effects.

Another alternative for at least partial deconfounding between several features and the target of a machine learning model according to specific causal assumptions is the use of regularization and smoothing techniques during the training of the machine learning model and/or the specification of a feature sequence in combination with a coordinate descent optimization of the machine learning algorithm, such as the case in cyclic boosting. An example for the regularization/smoothing approach is to restrict the learning of the causal factor between a feature describing the seasonality over the year and the target to a smooth sinusoidal dependency, letting spikes in the corresponding distribution be described by the causal variable promotional price reduction, which is another feature of the machine learning model.

In an embodiment in which model training system 110 performs one or more demand forecasting actions and does not deconfound data, model training system 110 may use input data 220 stored in database 114 as training data 224 for one or more machine learning models. On the other hand, in an embodiment in which model training system 110 performs one or more demand shaping actions, model training system 110 may use deconfounded data 222 in addition to, or instead of, training data 224 to train one or more machine learning models.

Causal factor model 204 comprises an untrained model used by training module 206 to generate one or more trained models 228. In an embodiment, causal factor model 204 may use a cyclic boosting process in multiplicative mode as a machine learning algorithm. According to one embodiment, causal factor model 204 is trained from training data 224 to predict a volume Y (target) from a set of identified causal factors X that describe the strength of each factor variable contributing to causal factor model 204 prediction.

Training module 206 uses training data 224 to train causal factor model 204 by identifying causal factors and generating one or more trained models 228. As described in more detail below, training module 206 uses causal factor model 204 to calculate causal factors and the effects of causal factors from training data 224.

In an embodiment, prediction module 208 applies samples of current data 230 to trained models 228 to generate demand forecasting predictions stored as predictions data 232. Prediction module 208 may predict a volume Y (target) from a set of causal factors X along with causal factors strengths that describe the strength of each causal factor variable contributing to the predicted volume. For the purposes of this disclosure, the meaning of Y is the same as described above for causal factor model 204. In an embodiment in which model training system 110 performs one or more demand shaping actions and has deconfounded input data 220, prediction module 208 may generate one or more what-if volume predictions from sets of hypothetical causal factors X (such as, for example, the effect of one or more product prices on product demand). According to some embodiments, prediction module 208 generates predictions at daily intervals. However, embodiments contemplate longer and shorter prediction phases that may be performed, for example, weekly, twice a week, twice a day, hourly, or the like.

User interface module 210 of model training system 110 generates and displays a user interface (UI), such as, for example, a graphical user interface (GUI), that displays data stored in database 114, 124, and/or 134, including but not limited to one or more interactive visualizations of predictions and the contribution from one or more causal factors to the prediction. According to embodiments, user interface module 210 displays a GUI comprising interactive graphical elements for selecting one or more items, stores, or customers and, in response to the selection, displaying one or more graphical elements identifying one or more causal factors and the relative importance of the retrieved one or more causal factors to the prediction of the demand quantity. Further, user interface module 210 may display interactive graphical elements provided for modifying future states of the one or more identified causal factors, and, in response to modifying the one or more future states of the causal factors, modifying input values to represent a future scenario corresponding to the modified futures states of the one or more causal factors. For example, embodiments of user interface module 210 provide what-if scenario modeling and prediction for modifying a future price or promotion variable to identify and calculate the change in a prediction based on a change in promotional strategy using historical supply chain data 250. A proper distinction between causal factors and lagged target information may be crucial for what-if scenarios, because the target autocorrelation is a spurious correlation due to the effect of the causal factors.

Input data 220 of model training system 110 database 114 comprises a selection of one or more periods of historical supply chain data 250 aggregated or disaggregated at various levels of granularity. According to one embodiment, input data 220 comprises historic time series data, such as sales patterns, prices, promotions, weather conditions, and other factors influencing future demand of a particular item sold in a given store on a specific day. In an embodiment, model training system 110 may receive input data 220 from archiving system 120, one or more supply chain planning and execution systems 130, one or more supply chain entities 140, computer 150, or one or more data storage locations local to, or remote from, supply chain network 100 and model training system 110. In an embodiment in which model training system 110 performs one or more demand forecasting actions and does not deconfound data, model training system 110 may use input data 220 stored in database 114 as training data 224 for one or more models.

In embodiments in which model training system 110 performs one or more demand shaping actions and does deconfound data, deconfounded data 222 of model training system 110 database 114 comprises deconfounded data generated by data processing module 202. In an embodiment, historical supply chain data 250, customer data 292, input data 220, and/or other data stored in model training system 110 database 114 may comprise one or more confounding variables ("confounders") that influence both independent variables (such as, for example, one or more causal factors) and dependent variables (such as, for example, one or more demand shape predictions and/or machine learning model outputs). In an embodiment, data processing module 202 may deconfound input data 220 to isolate or reduce the influencing effect of one or more confounders from one or more independent variables, causal factors, and/or other variables or data stored in input data 220, and may store deconfounded data 222 in deconfounded data 222 of model training system 110 database 114.

Training data 224 of model training system 110 database 114 comprises, according to embodiments, input data 220 (for demand forecasting embodiments) and/or deconfounded data 222 (for demand shaping embodiments). In an embodiment, training module 206 accesses training data 224 and inputs training data 224 into causal factor model 204 to generate one or more trained models 228. In other embodiments, training data 224 may comprise price-demand elasticity data, including but not limited to data related to one or more product sales price-demand elasticity relationships. By way of example only and not by way of limitation, price-demand elasticity data may comprise data recording the effect that setting the price of a particular product has on the sales of that product over a specified period of time.

Causal factors data 226 comprises one or more horizon-independent causal factors identified by training module 206 in the process of training causal factor model 204. For the purposes of training causal factor model 204, causal factors represent exterior factors that may positively or negatively influence the target described above.

According to embodiments, causal factors may comprise, for example, any exterior factor that positively or negatively influences the absolute individual causal effect, such as: price-demand elasticity, sales promotions, traditional heavy shopping days (such as but not limited to "Black Friday"), weather events (such as, for example, a heavy storm raining out roads, decreasing customer traffic and subsequent sales), political events (such as, for example, tax refunds increasing disposable customer income, or trade tariffs increasing the price of imported goods), and/or the day of the week (as a causal factor and not as lagged target time series information), or other factors influencing sales.

Trained models 228 may comprise one or more causal factor models 204 trained from training data 224 to forecast demand and to subsequently predict individual causal effects (such as, for example, increases or decreases in product sales based on the selection of product prices) along with causal factors and the contributing strength of each causal factor variable in contributing to the prediction.

Current data 230 comprises data used to generate a prediction from trained models 228. According to embodiments, current data 230 comprises current sales patterns, prices, promotions, weather conditions, and other current factors influencing demand of a particular item sold in a given store on a specific day or of a particular customer. Current data 230 may also comprise one or more what-if scenarios, in which one or more causal factors or other data are altered from one or more baselines or measured values.

Predictions data 232 comprises the demand predictions, as well as the contributions from one or more causal factors used by prediction module 208 to generate the prediction. According to one embodiment, predictions data 232 comprises a predicted volume Y (target) predicted from a set of causal factors X. In other embodiments, predictions data 232 comprises a what-if predicted volume Y predicted from sets of hypothetical causal factors X.

As described above, archiving system 120 comprises server 122 and database 124. Although archiving system 120 is illustrated as comprising single server 122 and single database 124, embodiments contemplate any suitable number of servers 122 or databases 124 internal to or externally coupled with archiving system 120.

Server 122 comprises data retrieval module 240. Although server 122 is illustrated and described as comprising single data retrieval module 240, embodiments contemplate any suitable number or combination of data retrieval modules 240 located at one or more locations, local to, or remote from archiving system 120, such as on multiple servers 122 or computers 150 at one or more locations in supply chain network 100.

In one embodiment, data retrieval module 240 receives historical supply chain data 250 from one or more supply chain planning and execution systems 130 and one or more supply chain entities 140, and stores the received historical supply chain data 250 in archiving system 120 database 124. According to one embodiment, data retrieval module 240 of model training system 110 may prepare historical supply chain data 250 for use as input data 220 of model training system 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like and stores the received data as historical supply chain data 250.

Database 124 may comprise one or more databases or other data storage arrangements at one or more locations, local to, or remote from, server 122. Database 124 comprises, for example, historical supply chain data 250. Although database 124 is illustrated and described as comprising historical supply chain data 250, embodiments contemplate any suitable number or combination of data, located at one or more locations, local to, or remote from, archiving system 120, according to particular needs.

Historical supply chain data 250 comprises historical data received from model training system 110, archiving system 120, one or more supply chain planning and execution systems 130, one or more supply chain entities 140, and/or computer 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As described above, planning and execution system 130 comprises server 132 and database 134. Although planning and execution system 130 is shown as comprising single server 132 and single database 134, embodiments contemplate any suitable number of servers 132 or databases 134 internal to or externally coupled with planning and execution system 130.

Server 132 comprises planning module 270 and prediction module 208. Although server 132 is illustrated and described as comprising single planning module 270 and single prediction module 208, embodiments contemplate any suitable number or combination of planning modules 270 and prediction modules 208 located at one or more locations, local to, or remote from planning and execution system 130, such as on multiple servers or computers 150 at one or more locations in supply chain network 100.

Database 134 may comprise one or more databases or other data storage arrangements at one or more locations, local to, or remote from, server 132. Database 134 comprises, for example, transaction data 280, supply chain data 282, product data 284, inventory data 286, inventory policies 288, store data 290, customer data 292, demand forecasts 294, supply chain models 296, and prediction models 298. Although database 134 is illustrated and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution system 130, according to particular needs.

Planning module 270 works in connection with prediction module 208 to generate a plan based on one or more predicted retail volumes, classifications, or other predictions. By way of example only and not of limitation, planning module 270 may comprise a demand planner that generates a demand forecast for one or more supply chain entities 140. Planning module 270 may generate the demand forecast, at least in part, from predictions and calculated factor values for one or more causal factors received from prediction module 208. By way of a further example, planning module 270 may comprise an assortment planner and/or a segmentation planner that generates product assortments that match causal effects calculated for one or more customers or products by prediction module 208, which may provide for increased customer satisfaction and sales, as well as reducing costs for shipping and stocking products at stores where they are unlikely to sell.

Prediction module 208 applies samples of transaction data 280, supply chain data 282, product data 284, inventory data 286, store data 290, customer data 292, demand forecasts 294, and other data to prediction models 298 to generate predictions and calculated factor values for one or more causal factors. As described above in connection with prediction module 208 of model training system 110, prediction module 208 of planning and execution system 130 predicts a volume Y (target) from a set of causal factors X along with causal factors strengths that describe the strength of each causal factor variable contributing to the predicted volume. According to some embodiments, prediction module 208 generates predictions at daily intervals. However, embodiments contemplate longer and shorter prediction phases that may be performed, for example, weekly, twice a week, twice a day, hourly, or the like.

Transaction data 280 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286, which may be used by planning and execution system 130 to place orders, set inventory levels at one or more stocking points, initiate manufacturing of one or more components, or the like in response to, and based at least in part on, a forecasted demand of model training system 110.

Inventory policies 288 may comprise any suitable inventory policy describing the reorder point and target quantity, or other inventory policy parameters that set rules for model training system 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a set probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, model training system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, demand forecasts 294 may also take into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 comprising a demand planner would need to calculate approximately 2×10^10 demand forecasts 294 each day to derive the optimal order volume for the next delivery cycle (e.g. three days).

Supply chain models 296 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 298 comprise one or more of trained models 228 used by planning and execution system 130 for predicting, among other variables, pricing, targeting, or retail volume, such as, for example, a forecasted demand volume for one or more products at one or more stores of one or more retailers based on the prices of the one or more products.

Figure 3:
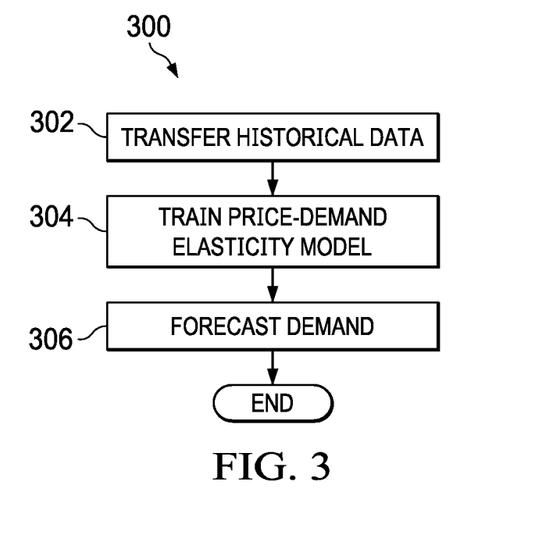
FIG. 3 illustrates an exemplary method of forecasting demand using historical data and one or more price-demand elasticity causal factors, according to an embodiment.

FIG. 3 illustrates exemplary method 300 of forecasting demand using historical data and one or more price-demand elasticity causal factors, in accordance with an embodiment. Method 300 proceeds by one or more actions, which although described in a particular order, may be performed in one or more permutations, according to particular needs.

At action 302, data processing module 202 of server 112 transfers historical supply chain data 250 from archiving system 120, and/or customer data 292 from planning and execution system 130, into training data 224 of model training system 110 database 114. In other embodiments, data retrieval module 240 of archiving system 120 may transfer historical supply chain data 250 from archiving system 120 to training data 224 of model training system 110 database 114.

At action 304, training module 206 trains one or more price-demand elasticity models using training data 224. In an embodiment, training module 206 accesses training data 224 and uses it to train causal factor model 204 and generate one or more trained models 228 by identifying, from training data 224, one or more causal factors as well as the strengths with which each of the one or more causal factors contributes to the predicted volume output of the one or more trained models 228. According to embodiments, training module 206 may use any machine learning process, including but not limited to a cyclic boosting process, to identify one or more causal factors, train causal factor model 204, and/or generate one or more trained models 228. Training module 206 identifies causal factors and stores the causal factors in causal factors data 226. Training module 206 stores the one or more trained models 228 in trained models 228 of model training system 110 database 114.

Training module 206 may identify one or more price-demand elasticity causal factors in the process of training one or more price-demand elasticity models. In an embodiment, training module 206 uses the following price-demand elasticity formula (equation 1) to train one or more price-demand elasticity models and to generate one or more trained models 228, where D is estimated demand, P is reduced price, $P_0$ is normal price, X represents the independent variables used as features, and m is the price-demand elasticity parameter:

$$D(P,X)=D(X_f|P_0)*\exp(-m(X_e)*(P/P_0-1)) \qquad (1)$$

In an embodiment, the parameter m may comprise several features (for example location, product group, or day of the week), where the different values (or bins in cyclic boosting) for each of these features reflect different price-demand elasticities. These features $X_e$ may be different from the features $X_f$ used in the demand model at normal price D $(X_f|P_0)$.

In an embodiment, training module 206 may identify one or more price-demand elasticity causal factors that utilize two sets of parameters, f and e. In this embodiment, the f parameters may correspond to multiplicative effects in feature bins D $(X|P_0)=\mu*f1*f2*f3*$ .... The e parameters may correspond to different price elasticities in feature bins m $(X)=e1*e2*e3*$ .... Training module 206 may use a cyclic boosting process to cycle through selected features and respective parameters while keeping all currently-unselected features and respective parameters fixed (cycling through one feature with all its bins at a time), and may optimize all f parameters with the usual cyclic boosting multiplicative approach while optimizing all e parameters with an iterative, numerical method (including but now limited to Newton's method) based on maximum likelihood estimation. Due to the additional exponential term in equation 1, the e parameters cannot be estimated with the usual, analytical solution.

At action 306, prediction module 208 uses one or more trained models 228 to forecast demand by predicting a demand target variable. A prediction process may comprise, for example, predicting the demand of a given item in a given store over a defined time period. Prediction module 208 may access current data 230, such as, for example, current sales patterns, prices, promotions, weather conditions, and other current factors influencing demand of a particular item sold in a given store on a specific day, and may input current data 230 to one or more trained models 228. Prediction module 208 may apply current data 230 to one or more trained models 228 to generate one or more target variable predictions, and may also generate a prediction with an explanation of the strength with which each of the one or more causal factors influences the prediction. Having generated one or more target variable predictions, prediction module 208 stores the target variable predictions in predictions data 232. User interface module 210 may access predictions data 232, and may generate one or more charts, graphs, or other displays to display predictions data 232.

Figure 4:
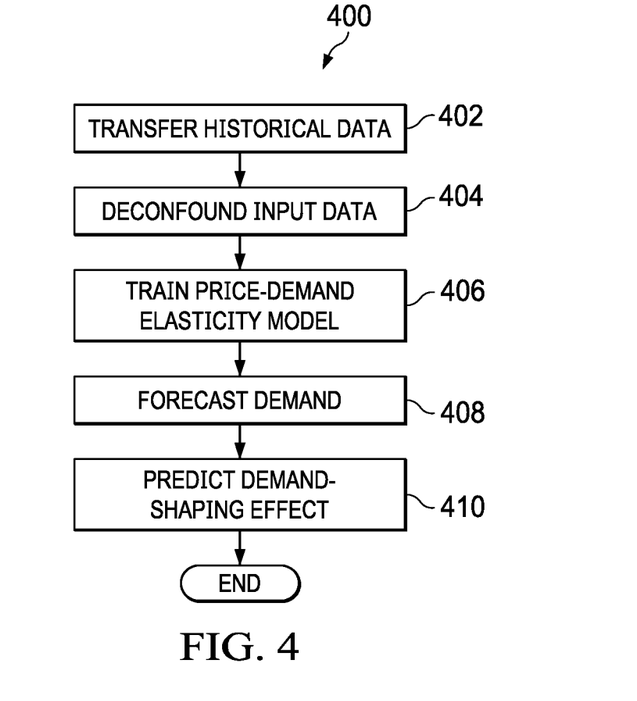
FIG. 4 illustrates an exemplary method of predicting a demand-shaping effect from a set of causal inferences, including one or more price-demand elasticity causal factors; according to an embodiment.

FIG. 4 illustrates exemplary method 400 of predicting a demand-shaping effect from a set of causal inferences, including one or more price-demand elasticity causal factors, according to an embodiment. Method 400 proceeds by one or more actions, which although described in a particular order, may be performed in one or more permutations, according to particular needs.

At action 402, data processing module 202 of server 112 transfers historical supply chain data 250 from archiving system 120, and/or customer data 292 from planning and execution system 130, into input data 220 of model training system 110 database 114. In other embodiments, data retrieval module 240 of archiving system 120 may transfer historical supply chain data 250 from archiving system 120 to input data 220 of model training system 110 database 114.

At action 404, data processing module 202 accesses input data 220, deconfounds the input data, and stores the deconfounded input data in deconfounded data 222 of model training system 110 database 114. In an embodiment, data processing module 202 may conduct one or more randomized controlled A/B group trials to deconfound input data 220. According to embodiments, a randomized controlled A/B group trial may comprise randomly selecting, from a data population, an A group and a B group within which to test the effect of one or more causal factors, such as but not limited to different product prices. In other embodiments, data processing module 202 may use any statistical deconfounding technique, such as independence weighting with inverse propensity scores, to deconfound input data 220 and generate deconfounded data 222 without conducting one or more randomized controlled A/B group trials, according to particular needs.

In an embodiment, model training system 110 may apply regularization and smoothing techniques during the training of the machine learning model in action 406, described below. The regularization and smoothing techniques correspond to causal assumptions directly embedded in the machine learning model. An example for the regularization/smoothing approach is to restrict the learning of the dependency between the target and specific causal factors to defined parametric forms, e.g. linear functions, in order to enforce the model to describe some, potentially causal, effects by other features of the machine learning model.

At action 406, training module 206 trains one or more price-demand elasticity trained models 228 using training data 224 and/or deconfounded data 222. In an embodiment, training module 206 accesses training data 224 and/or deconfounded data 222, and uses training data 224 and/or deconfounded data 222 to train causal factor model 204 and generate one or more trained models 228 by identifying, from training data 224, one or more causal factors as well as the strengths with which each of the one or more causal factors contributes to the predicted volume output of the one or more trained models 228. According to embodiments, training module 206 may use any machine learning process capable of modeling data with positive and negative sample weights, including but not limited to a cyclic boosting process, to identify one or more causal factors, train causal factor model 204, and/or generate one or more trained models 228. Training module 206 identifies causal factors and stores the causal factors in causal factors data 226. Training module 206 stores the one or more trained models 228 in trained models 228 of model training system 110 database 114.

As described above with respect to method 300, training module 206 may identify one or more price-demand elasticity causal factors in the process of training one or more price-demand elasticity trained models 228. In an embodiment, training module 206 uses the price-demand elasticity formula of equation 1 to train one or more trained models 228, where the variable m may comprise several price features (for example location, events, or weather conditions), each of which allowing the estimation of different price-demand elasticities for each of its values (or bins for the continuous features). Training module 206 may utilize two sets of parameters, f and e, in the manner described above.

At action 408, prediction module 208 uses one or more trained models 228 to forecast the demand of a given item in a given store over a defined time period. Prediction module 208 may access current data 230, such as, for example, current sales patterns, prices, promotions, weather conditions, and other current factors influencing demand of a particular item sold in a given store on a specific day, and may input current data 230 to one or more trained models 228. Prediction module 208 may apply current data 230 to one or more trained models 228 to generate one or more target variable predictions, and may also generate a prediction with an explanation of the strength with which each of the one or more causal factors influences the prediction. Having generated one or more target variable predictions, prediction module 208 stores the target variable predictions in predictions data 232. User interface module 210 may access predictions data 232, and may generate one or more charts, graphs, or other displays to display predictions data 232. In an embodiment, user interface module 210 may display interactive graphical elements providing for modifying future states of the one or more identified causal factors, and, in response to modifying the one or more future states of the causal factors, modifying input values to represent a future scenario corresponding to the modified futures states of the one or more causal factors, thereby permitting one or more demand-shaping actions (such as controlling product sales by setting product prices at a specific value).

At action 410, prediction module 208 uses the trained model to predict the individual causal effect of a demand-shaping action, such as a price change, on the target variable, i.e. the demand, for a given item in a given store over a defined time period. For this, prediction module 208 predicts the demand and subsequently compares the demand for both potential scenarios, normal and reduced price, by using the corresponding values for the price in equation 1 in two separate prediction runs. Model training system 110 may then terminate method 400.

To illustrate the operation of model training system 110 generating a trained model that predicts the demand-shaping effect of a potential price reduction, the following example is now given. In this example, model training system 110 executes the actions of method 400 to generate a trained model that identifies the price-demand elasticity effect that setting the price of a particular product (in this example, "Product X") has on customer demand, thereby permitting Product X demand shaping by setting the price of Product X to one or more specified levels (in this example, to two different Product X prices: "Discount Price" and "Full Price"). Although particular examples of model training system 110 and trained models 228 are illustrated and described herein, embodiments contemplate model training system 110 executing the actions of method 400 to identify any causal effects, conduct any data deconfounding technique and generate any trained models 228, according to particular needs.

In this example, at action 402, data processing module 202 of server 112 transfers historical product sales data for a particular retail store ("Store Y"), from archiving system 120 into input data 220 of model training system 110 database 114. In this example, input data 220 includes sales and price data for Store Y and Product X for two years, where the "Discount Price" is active for 10% of the time and the "Full Price" is active for the remaining 90% of the time. Although this example illustrates an embodiment of model training system 110 executing the actions of the demand shaping method with respect to a single product (Product X) sold at a single store (Store Y) over a single period of time (in this example, two years), embodiments contemplate model training system 110 accessing data pertaining to, and executing the actions of the demand shaping method for, any number of products, stores, supply chain entities 140, and time periods, according to particular needs.

Continuing the example, at action 404, data processing module 202 accesses input data 220, deconfounds input data 220, and stores the deconfounded input data in deconfounded data 222 of model training system 110 database 114. At action 406, training module 206 trains a machine learning model using deconfounded data 222 as model-training data, where deconfounded data 222 includes various different products and stores. In this example, training module 206 accesses training data 224, which in this example includes price-demand elasticity data in the form of the different sales quantities with respect to the Discount Price and Full Price of the different products, including Product X. Training module 206 uses training data 224 to train causal factor model 204 and generate one or more trained models 228 by identifying, from training data 224, one or more causal factors (including but not limited to a price-demand elasticity causal factor) as well as the strengths with which each of the one or more causal factors contributes to the individual predicted demand output of the one or more trained models 228. In this example, the price-demand elasticity causal effect of the Discount Price of Product X as compared to the Full Price results in average over the two years in a 30% increase in Product X sales. According to embodiments, training module 206 may use any machine learning process capable of modeling an individualized price-demand elasticity, including but not limited to a cyclic boosting process, to (1) identify the price-demand elasticity causal effect of choosing different Product X prices on Product X sales, (2) train causal factor model 204, and/or (3) generate one or more trained models 228. Training module 206 stores the trained model in trained models 228 of model training system 110 database 114. Furthermore, although this example illustrates model training system 110 conducting two different prices for Product X, embodiments contemplate model training system 110 conducting any other methods to determine the price-demand elasticity of one or more products at any number of product prices, according to particular needs.

Continuing the example, at action 408, prediction module 208 uses the trained model stored in trained models 228 to predict the demand as a target variable. Prediction module 208 accesses current data 230 and applies current data 230 to the trained model. Prediction module 208 stores the predictions generated by the trained model in predictions data 232. In this example, the active price for current data 230 is the Discount Price.

Concluding with this example, at action 410, prediction module 208 uses the trained model to predict the demand of the counterfactual price (in this example the Full Price) and compares it to the corresponding prediction for the previously-calculated Discount Price.

Figure 5:
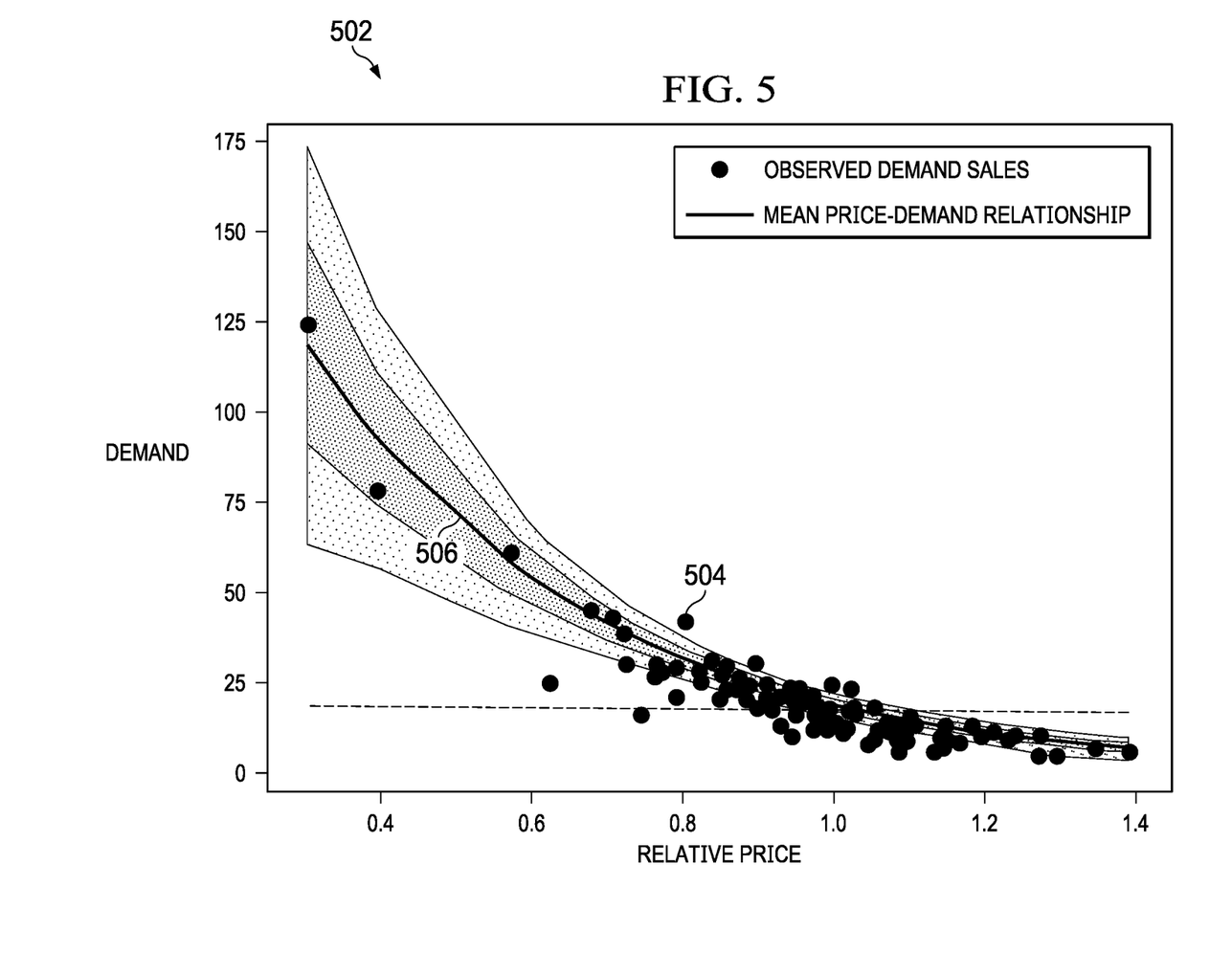
FIG. 5 illustrates an exemplary price-demand elasticity relationship for an exemplary product, according to an embodiment.

FIG. 5 illustrates exemplary price-demand elasticity relationship 502 for an exemplary product, according to an embodiment. In the embodiment illustrated by FIG. 5, price-demand elasticity relationship 502 displays model training system 110 training data 224 comprising plurality of observed demand sales 504 for different relative product prices and mean price-demand relationship 506. Although FIG. 5 illustrates exemplary price-demand elasticity relationship 502 in a particular configuration and comprising observed demand sales 504 and mean price-demand relationship 506, embodiments contemplate model training system 110 generating and displaying price-demand elasticity relationships 502 comprising any data stored in databases 114, 124, and 134, according to particular needs. In an embodiment, user interface module 210 may access data stored in databases 114, 124, and/or 134, and may generate one or more price-demand elasticity relationships 502 for display on output device 154.

In the embodiment illustrated by FIG. 5, as the price of the product increases (illustrated as relative price reaches a value of 1.0 or above), observed demand sales 504 for the product decrease. Conversely, as the price of the product decreases (illustrated in FIG. 5 as relative price decreases below a value of 1.0), observed demand sales 504 for the product increase. Each individual observed demand sale 504 illustrated by FIG. 5 may comprise sales data for a particular product sold at a specified relative price at one or more locations.

In demand forecasting embodiments of model training system 110, training module 206 may use deconfounded data 222 and/or price-demand elasticity training data 224, including but not limited to data related to price-demand elasticity relationships 502 illustrated by FIG. 5, to train a machine learning model to forecast demand for one or more products sold at one or more locations over one or more time periods. In demand shaping embodiments of model training system 110, training module 206 may use deconfounded data 222 and/or price-demand elasticity training data 224, including but not limited to data related to price-demand elasticity relationships 502 illustrated by FIGS. 5, to (1) train a machine learning model to forecast demand for one or more products sold at one or more locations over one or more time periods, and (2) to use the trained machine learning model to shape demand by setting product prices to one or more specified levels. According to embodiments, model training system 110 may permit the optimization of one or more metrics, such as gross profit, net revenue, or maximum product sales, by setting product prices to shape product demand and sales. Model training system 110 may also permit the prediction of individual price-demand elasticity curve parameters and the use of curve parameters as a sub-estimator in a larger demand forecasting model.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A computer-implemented method, comprising:
training, by a first iterative approach comprising cyclic boosting in multiplicative mode, a machine learning model to identify one or more external causal factors that influence demand for one or more products;
training, by a second iterative approach comprising cyclic boosting in multiplicative mode that cycles through features and parameters, the machine learning model to generate one or more price-demand elasticity causal factors to predict a target outcome for a given product demand;
predicting, with the machine learning model, a demand for the one or more products based, at least in part, on the identified one or more external causal factors and the generated one or more price-demand elasticity causal factors, wherein the machine learning model is a first machine learning model, the one or more price-demand elasticity causal factors is one or more first price-demand elasticity causal factors the target outcome is a first target outcome and the demand is a first demand;

deconfounding historical demand data for the one or more products;

training a second machine learning model to generate, based on the deconfounded historical demand data for the one or more products, one or more second price-demand elasticity causal factors to predict a second target outcome for the given product demand;

predicting, with the second machine learning model, a second demand for the one or more products based, at least in part, on the identified one or more external causal factors and the generated one or more second price-demand elasticity causal factors; and shaping the predicted second demand for the one or more products by altering one or more product price variables of the one or more products.

2. The computer-implemented method of claim 1, further comprising:

transmitting, by the computer and in response to the predicted demand for the one or more products, instructions to alter actions at one or more supply chain entities, the instructions comprising one or more of:

an instruction to increase capacity at one or more supply chain entity locations;

an instruction to alter product supply levels at the one or more supply chain entities;

an instruction to adjust product mix ratios at the one or more supply chain entities; and an instruction to alter the configuration of packaging of one or more products sold by the one or more supply chain entities.

3. The computer-implemented method of claim 1, further comprising:

displaying, on an output device, the predicted demand for the one or more products based, at least in part, on the identified one or more external causal factors and the generated one or more price-demand elasticity causal factors.

4. The computer-implemented method of claim 1, further comprising:

predicting, with the second machine learning model, a third demand for the one or more products based, at least in part, on the identified one or more external causal factors, the generated one or more second price-demand elasticity causal factors, and the shaped predicted second demand for the one or more products.

5. The computer-implemented method of claim 1, further comprising:

deconfounding the historical demand data for the one or more products by conducting one or more randomized controlled A/B group trials to deconfound one or more cause-effect relationships of the historical demand data and corresponding causal variable data from one or more potential confounding variables.

6. A system, comprising:

a computer, comprising a processor and memory, the computer configured to:

train, by a first iterative approach comprising cyclic boosting in multiplicative mode, a machine learning model to identify one or more external causal factors that influence demand for one or more products;

train, by a second iterative approach comprising cyclic boosting in multiplicative mode that cycles through features and parameters, the machine learning model to generate one or more price-demand elasticity causal factors to predict a target outcome for a given product demand;

predict, with the machine learning model, a demand for the one or more products based, at least in part, on the identified one or more external causal factors and the generated one or more price-demand elasticity causal factors, wherein the machine learning model is a first machine learning model, the one or more price-demand elasticity causal factors is one or more first price-demand elasticity causal factors the target outcome is a first target outcome, the demand is a first demand and the computer is further configured to:

deconfound historical demand data for the one or more products;

train a second machine learning model to generate, based on the deconfounded historical demand data for the one or more products, one or more second price-demand elasticity causal factors to predict a second target outcome for the given product demand;

predict, with the second machine learning model, a second demand for the one or more products based, at least in part, on the identified one or more external causal factors and the generated one or more second price-demand elasticity causal factors; and shape the predicted second demand for the one or more products by altering one or more product price variables of the one or more products.

7. The system of claim 6, wherein the computer is further configured to transmit, in response to the predicted demand for the one or more products, instructions to alter actions at one or more supply chain entities, the instructions comprising one or more of:

an instruction to increase capacity at one or more supply chain entity locations;

an instruction to alter product supply levels at the one or more supply chain entities;

an instruction to adjust product mix ratios at the one or more supply chain entities; and an instruction to alter the configuration of packaging of one or more products sold by the one or more supply chain entities.

8. The system of claim 6, wherein the compute is further configured to:

display, on an output device, the predicted demand for the one or more products based, at least in part, on the identified one or more external causal factors and the generated one or more price-demand elasticity causal factors.

9. The system of claim 6, further comprising the computer:

predicting, with the second machine learning model, a third demand for the one or more products based, at least in part, on the identified one or more external causal factors, the generated one or more second price-demand elasticity causal factors, and the shaped predicted second demand for the one or more products.

10. The system of claim 6, wherein the computer is further configured to:

deconfound the historical demand data for the one or more products by conducting one or more randomized controlled A/B group trials to deconfound one or more cause-effect relationships of the historical demand data and corresponding causal variable data from one or more potential confounding variables.

11. A non-transitory computer-readable storage medium embodied with software, the software when executed configured to:
- train, by a first iterative approach comprising cyclic boosting in multiplicative mode, a machine learning model to identify one or more external causal factors that influence demand for one or more products;
- train, by a second iterative approach comprising cyclic boosting in multiplicative mode that cycles through features and parameters, the machine learning model to generate one or more price-demand elasticity causal factors to predict a target outcome for a given product demand;
- predict, with the machine learning model, a demand for the one or more products based, at least in part, on the identified one or more external causal factors and the generated one or more price-demand elasticity causal factors, wherein the machine learning model is a first machine learning model, the one or more price-demand elasticity causal factors is one or more first price-demand elasticity causal factors the target outcome is a first target outcome, the demand is a first demand and the software when executed is further configured to:
- deconfound historical demand data for the one or more products;
- train a second machine learning model to generate, based on the deconfounded historical demand data for the one or more products, one or more second price-demand elasticity causal factors to predict a second target outcome for the given product demand;
- predict, with the second machine learning model, a second demand for the one or more products based, at least in part, on the identified one or more external causal factors and the generated one or more second price-demand elasticity causal factors; and
- shape the predicted second demand for the one or more products by altering one or more product price variables of the one or more products.

12. The non-transitory computer-readable storage medium of claim 11, wherein the software when executed is further configured to:
- transmit, in response to the predicted demand for the one or more products, instructions to alter actions at one or more supply chain entities, the instructions comprising one or more of:
  - an instruction to increase capacity at one or more supply chain entity locations;
  - an instruction to alter product supply levels at the one or more supply chain entities;
  - an instruction to adjust product mix ratios at the one or more supply chain entities; and
  - an instruction to alter the configuration of packaging of one or more products sold by the one or more supply chain entities.

13. The non-transitory computer-readable storage medium of claim 11, wherein the software when executed is further configured to:
- display, on an output device, the predicted demand for the one or more products based, at least in part, on the identified one or more external causal factors and the generated one or more price-demand elasticity causal factors.

14. The non-transitory computer-readable storage medium of claim 11, wherein the software when executed is further configured to:
- predict, with the second machine learning model, a third demand for the one or more products based, at least in part, on the identified one or more external causal factors, the generated one or more second price-demand elasticity causal factors, and the shaped predicted second demand for the one or more products.

* * * * *